United States Patent [19]

Blanche

[11] Patent Number: 4,890,202

[45] Date of Patent: Dec. 26, 1989

[54] SYSTEM FOR MOUNTING DIFFERENT TYPES OF BULB ON THE REFLECTOR OF A LAMP

[75] Inventor: Andre Blanche, Montreuil, France

[73] Assignee: Societe Anonyme Financiere, Industrielle et Commerciale d'Equipements Automobiles et Aeronautiques-FICEA, Levallois Perrett, France

[21] Appl. No.: 338,833

[22] Filed: Apr. 14, 1989

[30] Foreign Application Priority Data

Apr. 19, 1988 [FR] France ................................ 88 05134

[51] Int. Cl.[4] ......................... B60Q 1/00; H01R 33/00

[52] U.S. Cl. ....................................... 362/61; 362/226; 362/457

[58] Field of Search ...................... 362/61.80, 226, 267, 362/457, 458, 296

[56] References Cited

U.S. PATENT DOCUMENTS

| | | | |
|---|---|---|---|
| 4,507,712 | 3/1985 | Dolan et al. | 362/61 |
| 4,564,891 | 1/1986 | Daumüller et al. | 362/306 |
| 4,590,542 | 5/1986 | Schawedeer et al. | 362/226 |
| 4,642,739 | 2/1987 | Daumülle et al. | 362/267 |
| 4,670,822 | 6/1987 | Baker | 362/226 |
| 4,679,128 | 7/1987 | Vanbuyn et al. | 362/226 |
| 4,764,854 | 8/1988 | Matsune et al. | 362/226 |

FOREIGN PATENT DOCUMENTS

A-2175644 10/1973 France .

*Primary Examiner*—Stephen F. Husar
*Assistant Examiner*—D. M. Cox
*Attorney, Agent, or Firm*—Nixon & Vanderhye

[57] ABSTRACT

In this mounting system, the bulb (10; 10') may be selected from a first type (10) and a second type (10'). The bulb defines a radial reference surface (11; 11') situated at a predetermined distance $d_1$ or $d_2$ from the midpoint (M) of its filament (12; 12'), where $d_1$ is not equal to $d_2$. The system comprises a bulb carrier (30) fixed to the reflector and defining a radial thrust surface (32) situated at a predetermined distance (f) from the focus (F) of the reflector; a first adaptor (40) suitable for co-operating with a bulb of the first type; and a second adapter (50) suitable for co-operating with a lamp of the second type. Thus, regardless of the type of bulb mounted on the bulb-carrier by the corresponding adaptor and regardless of the possible type of bulb support, the bulb filament is centered on the axis of the lamp and the axial position of the filament relative to the focus of the reflector is the same.

7 Claims, 2 Drawing Sheets

SYSTEM FOR MOUNTING DIFFERENT TYPES OF BULB ON THE REFLECTOR OF A LAMP

FIELD OF THE INVENTION

The present invention relates to a system for mounting different types of bulb on the reflector of a lamp.

It is particularly applicable to mounting bulbs on the parabolic reflectors of headlamps for vehicles such as cars, agricultural machinery, or hoisting or earth-moving machines, and the invention is described mainly in the context of this application.

However, the invention is not limited to parabolic reflectors, nor to vehicles or machines of the above types.

The invention is equally applicable to any type of reflector which requires a bulb to be accurately centered at a focus, as is the case, for example, with elliptical reflectors. In addition, the invention applies more generally to all types of lamps for use when driving or when working, in particular for fixed lighting installations, floodlights, flashlights, etc.

BACKGROUND OF THE INVENTION

When it is desirable, as is more and more frequently the case, to keep a machine operating without interruption 24 hours a day, then it is necessary to provide lighting equipment which covers the work area with high-intensity light over an extent which is as wide and as deep as possible.

The current trend in lighting equipment, in particular in work lamps, is thus to multiply the number of lighting sources.

In contrast, ever-increasing rationalization in the design and manufacture of machines means that the number of different types of components used in such lighting equipment should be kept as small as possible.

In order to avoid increasing the number of different spare parts and in order to reduce the number of different suppliers, it is essential, wherever possible, to use these same components from one lamp to another, from one machine to another, and indeed from one range of machines to another.

Further, and above all, it must be possible to repair defective parts on machines that are in service without delay so as to reduce machine downtime to a minimum, since downtime can be extremely expensive.

This aspect becomes more critical for worksites in regions where obtaining spare parts is difficult because of the time required for delivery and the limited stock available on site.

Further, in the special case of lighting equipment, there exist two different types of standard on a worldwide scale, namely European type standards and U.S. type standards.

European standards provide a series of bulbs which, for halogen bulbs, are bulbs of types H1 to H4. These bulb types differ in size and in configuration, and they are removably fittable on bulb-carriers fixed to reflectors, with each bulb-carrier having a special shape adapted to the type of bulb it is to receive.

For example, for H1 or H3 type bulbs, the corresponding bulb-carrier includes facing that extends in a radial plane and receiving the collar on the bulb, whereas for an H2 type bulb, the carrier includes resilient supports extending in an axial plane and receiving fins on the bulb.

Likewise, the way connection is made differs depending on the type of bulb and the associated bulb-carrier: for H1 bulbs, contact blades extend rearwardly from the base, for H2 bulbs, contact is made via the fixing fins, and H3 bulbs have a wire with a connection terminal.

Until recently, the only technique used under U.S. standards was that of "sealed beam" lamps, with each entire lamp constituting a sealed unit incorporated all of the optical components, including the filament which is therefore neither removable nor interchangeable.

This technique which was adopted in 1938 has only very recently (1983) suffered competition from European type systems having interchangeable bulbs: there now exist replaceable bulb lamps for which there are currently three standardized types (9004, 9005, and 9006), and other standards are in the process of being specified, in particular for bulbs running off 24 V (as is the case for most agricultural and worksite machines).

Bulbs satisfying the U.S. standards (one such bulb, type 9006, being shown in FIG. 2) are in the form of a halogen glass bulb mounted on a cylindrical barrel forming the base of the lightbulb, with the barrel being made of insulating material and being provided with a collar which is also insulating (unlike European bulbs since bulbs that have a collar use the collar as the ground contact). The barrel is extended rearwards by a handle (also omitted from European bulbs) enabling the assembly to be grasped and including the electrical feed contacts for the bulb. The base of the bulb also carries an annular sealing ring (not present on European bulbs) which, after a bayonet fitting provided on the collar has been rotated through $\frac{1}{8}$th of a turn in the lamp-carrier (which bayonet fitting is also missing from European bulbs), serves to provide complete sealing of the inside volume of the lamp, comparable to that obtained with sealed beam lamps, while nevertheless retaining the option of removing the bulb and avoiding the need for an outer protective cap or other comparable sealing means as is used in European lamps.

From the above, it will readily be understood that the two standardized types of bulb, i.e. European or U.S., are very different from each other, both with respect to their shapes and with respect to the functions they provide (with U.S. bulbs providing an additional sealing function which is not provided by European bulbs, while the mounting collar on European bulbs provides an electrical connection function which is not provided by the collar on U.S. bulbs, etc.).

The main object of the present invention is to provide a mounting system which makes it possible to utilize one or other type of bulb interchangeably, in particular which makes it possible to use a European type bulb or a U.S. type bulb, by providing the following functions simultaneously:

- diameter matching;
- filament positioning at a given point in the optical system (e.g. the focus of a parabola, or slightly ahead or behind the focus in order to spread the beam in controlled manner); and
- retention of the functions specific to each type of bulb (sealing, electrical connection points).

An object of the invention is to provide such a system which is universally applicable, cheap to manufacture, and simple in structure.

So long as a system is simple, it can be used by maintenance or repair personnel without requiring special training, in particular by virtue of the fact that even when the type of bulb in a given lamp is changed, the optical characteristics of the lamp are not changed and there is therefore no need to readjust its beam.

Since the system is cheap, it is possible firstly to fit a universal system on initial manufacture instead of fitting a system which can receive only one type of bulb, without significantly increasing the cost of the lamp.

It is then possible, secondly to accompany each spare bulb, e.g. in the same package as the bulb, with its specific adaptor part enabling it to be mounted on a lamp fitted with a universal mounting system of the invention. The cost of the spare part is not significantly increased since the major portion of the manufacturing cost of a bulb plus adaptor set is constituted by the cost of the bulb per se, and the maintenance operative need not trouble to find out beforehand whether a defective lamp was previously fitted with a bulb of the same type as the available spare or with a bulb of another type, since in any event the package containing the spare also contains event the required adaptor.

Stock control problems are thus reduced both for manufacture and for maintenance, and the two sources (initial manufacture and subsequent replacement) may be totally distinct and may provide bulbs of different types. Thus, a European manufacturer of lighting equipment can produce complete lamps fitted with readialy available European bulbs and then ship these equipments to manufacturers who can in turn sell machines fitted in this way throughout the world regardless of whether the bulbs readily available in any given country happen to be U.S. type bulbs or European type bulbs.

In the context of this example, if a faulty lamp is to be repaired in a country where the readily available bulbs are U.S. type bulbs (or if the person carrying out the repair only has U.S. type bulbs in stock), then it is necessary merely to remove the originally-installed European bulb together with its specific adaptor and replace them with the U.S. type bulb and its specific adaptor. Once the bulb-and-adaptor assembly has been locked into place, it is certain that the optical characteristics of the lamp will be identical with what they were before (since the mounting system of the invention makes it possible to retain the relative positions of the various optical parts in spite of the different shapes of the bulbs); in addition, in this particular example of replacement by means of a U.S. type bulb, the inside volume of the lamp will be reliably sealed, as is typical for lamps fitted with U.S. type bulbs.

SUMMARY OF THE INVENTION

To this end, the present invention provides a mounting system in which the bulb may be selected from a first type and a second type, with the bulb in each of these types being associated with a radial reference surface situated at a predetermined respective distance $d_1$ or $d_2$ from the midpoint of the filament of the bulb, where $d_1$ is not equal to $d_2$.

The mounting system comprises:

- a bulb-carrier fixed to the reflector and defining a radial thrust surface situated at a predetermined distance from the focus of the reflector;
- first adaptor means suitable for co-operating with a bulb of the first type, said first adaptor means being provided with an axial bore of a first diameter suitable for receiving the base or support of the bulb, said first adaptor means also including a first contact surface bearing against the reference surface of said first type of bulb, and a second contact surface bearing against the thrust surface of the bulb-carrier, said two contact surfaces being parallel to each other and being at a distance $D_1$ apart; and
- second adaptor means suitable for co-operating with a lamp of the second type, and second adaptor means being provided with an axial bore of a second diameter suitable for receiving the base or the support of a lamp of the second type, said second adaptor means further including a first contact surface bearing against the reference surface of said bulb of the second type, and a second contact surface bearing against the thrust surface of the bulb-carrier, said two contact surfaces being parallel to each other and being a distance $D_2$ apart, such that, algebraically, $D_2+d_2=D_1+d_1$.

Thus, regardless of the type of bulb mounted on the bulb-carrier by the corresponding adaptor means and regardless of the possible type of bulb support, the bulb filament is centered on the axis of the lamp and the axial position of the filament relative to the focus of the reflector is the same.

The invention may advantageously include one or more of the following features:

- the bulb-carrier further includes lockable resilient means for forcing the reference surface of the bulb or of its support against the first contact surface of the corresponding adaptor means;
- the adaptor means are mounted on the bulb-carrier merely by interfitting, with lockable resilient means serving, in addition, to force the second contact surface against the thrust surface of the bulb-carrier;
- the first or second adaptor means further include keying members for determining the angular position of the bulb relative to the axis of the lamp, in particular when the bulb has a transverse filament or when the bulb is provided with incorporated masking means defining a cut-off;
- the first or second adaptor means are electrically conductive and further include electrical connection members for establishing an electrical connection with the metal reference surface of the bulb, which surface constitutes one of the feed terminals thereof;
- a sealing ring is also provided interposed between the bulb-carrier and the first or second adaptor means; and
- the axial bore of the first or second adaptor means has an inside surface suitable for co-operating with sealing means provided on the facing portion of the bulb or of the bulb-carrier.

BRIEF DESCRIPTION OF THE DRAWINGS

An embodiment of the invention is described by way of example with reference to the accompanying drawings, in which.

DETAILED DESCRIPTION

It should be underlined, that although the present invention is described for an application in which the mounting system of the invention is used either with a European H3 type bulb or else with a U.S. 9005 type bulb in association with a common bulb-carrier in the same lamp, the invention is in no way limited to these particular bulb types, and the person skilled in the art can readily adapt the invention for use with other types of European bulb (e.g. H1), with other types of U.S. bulb (e.g. 9006), or with other types of bulb which are not standardized or which are not yet standardized.

Figure 1:
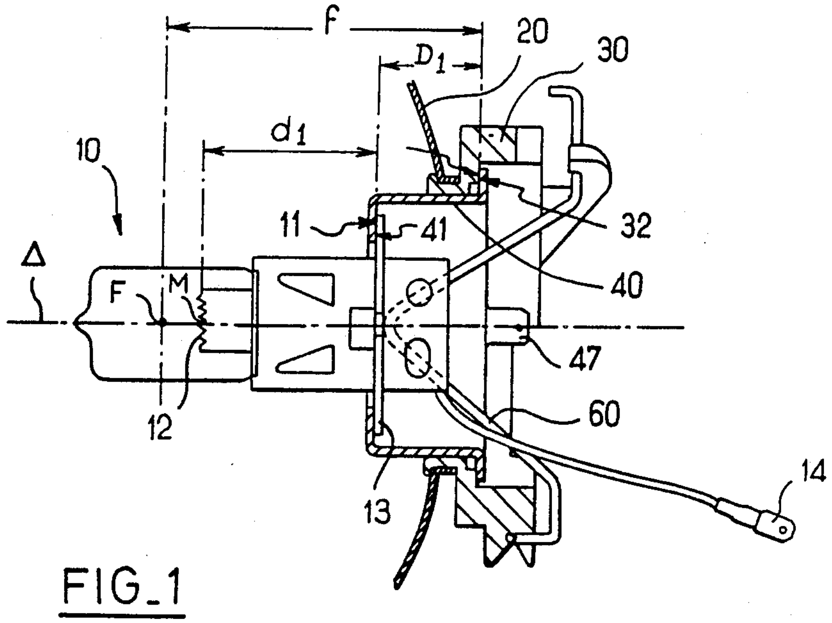
FIG. 1 is a section view through a mounting system of the present invention configured to enable a European H3 type bulb to be fitted.
Figure 3:
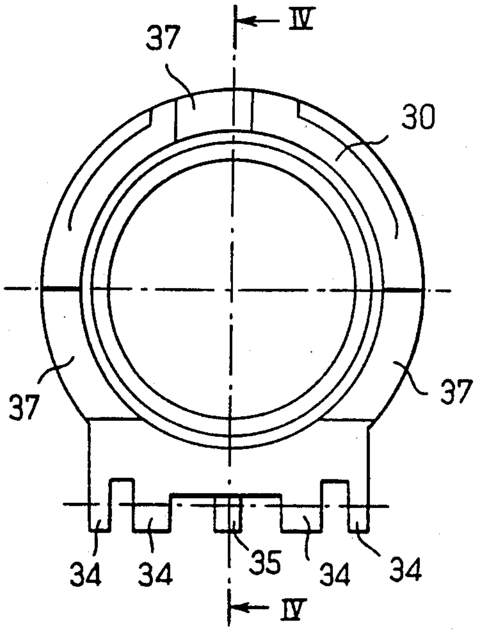
FIG. 3 is a front view of the FIG. 1 bulb-carrier as seen from line III—III of FIG. 4.
Figure 4:
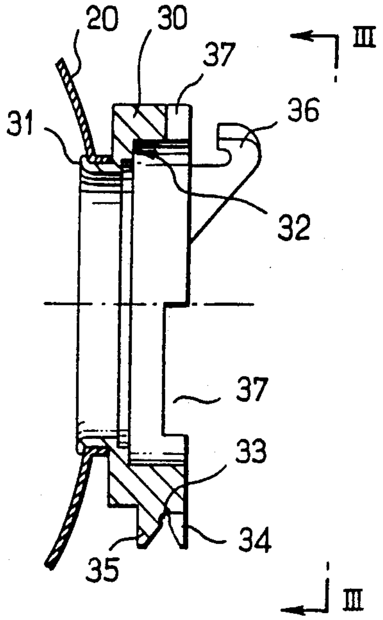
FIG. 4 is a section through the bulb-carrier, on line IV—IV of FIG. 3.
Figure 5:
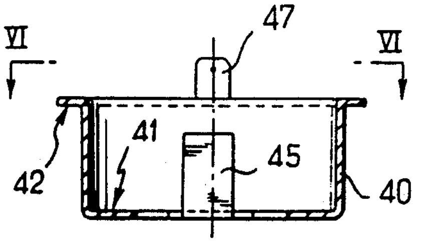
FIG. 5 is a cross-section on line V—V of FIG. 6 through the FIG. 1 adaptor for an H3 type bulb.
Figure 6:
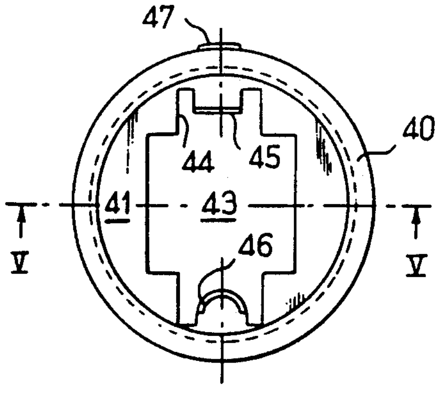
FIG. 6 is a front view of the FIG. 5 adaptor as seen from line VI—VI of FIG. 5.

FIG. 1 shows the system of the present invention applied to mounting a European H3 type bulb on the reflector of a lamp. Reference is also made to FIGS. 3 and 4 which show a bulb-carrier 30 on its own, and to FIGS. 5 and 6 which show an adaptor 40 on its own.

The lamp is of conventional structure and comprises a bulb 10 mounted on a parabolic reflector 20 with the midpoint M of the filament 12 of the bulb occupying an accurately determined position relative to the focus F of the parabola, e.g. slightly behind the focus, as shown, so that the resulting beam diverges slightly, thereby illuminating a larger area. Naturally, the point M is disposed on the central axis $\Delta$ of the projector.

The remainder of the structure of the lamp is conventional both mechanically and optically. The front of the parabolic reflector 20 is closed by a closure glass which is sealed to the reflector around its periphery, said glass including stripes or prisms for distributing the reflected light rays and for controlling the spread and the uniformness of the resulting beam.

An H3 bulb is a bulb including a metal collar 13 which defines a reference surface 11 which is also used as a thrust surface, with said reference surface 11 being situated at a distance $d_1$ from the filament 12. In this type of lamp, electrical connection is provided firstly by a terminal 14 disposed on the end of an insulated wire for connection to a positive feed voltage, and secondly by the metal collar 13 itself which should be connected to electrical ground of the vehicle or machine.

The reflector 20 is provided with a bulb-carrier 30 (shown on its own in FIGS. 3 and 4) which is crimped at 31 onto the parabolic reflector 20 around the periphery of an opening therethrough.

The bulb-carrier defines a thrust surface 32 which extends in a radial plane and which is situated at a predetermined distance f from the focus F of the parabolic of the reflector 20.

The outside portion of the bulb-carrier 30 (FIGS. 3 and 4) also includes a rectilinear groove 33 for receiving a spring 60 (FIG. 1) for holding the items mounted on the bulb-carrier in position. As explained below, the spring (which must be capable of being removed and replaced) is removably mounted in the groove 33. In order to facilitate inserting a new spring in the groove, top and bottom guide projections 34 and 35 respectively are provided to prevent a user from twisting the spring wire when inserting it. The spring is held in place by means of one or more hooks 36 (depending on whether the spring includes one or more branches) serving to hold the spring under tension and thus ensure that the desired clamping force is applied.

Finally, the bulb-carrier 30 may include notches 37 for keying purposes and/or for angular positioning purposes, as explained below.

The bulb 10 is not directly mounted on the bulb-carrier 30, unlike prior art mounting techniques. On the contrary, and in a manner characteristic of the present invention, an intermediate adaptor element 40 is used (as shown on its own in FIGS. 5 and 6), which element is in the form of a cup having an opening 43 in its bottom in which an H3 type bulb is received, with the outline 44 of the opening being shaped so as to ensure that the bulb takes up the desired angular position (given that the bulb has a transverse filament, its angular position is important if the beam is to spread in the desired direction). Projecting blades 45 and 46 are also provided at the periphery of the opening 43 for the purpose of co-operating with complementary portions of the bulb.

Further, the adaptor 40 defines two thrust surfaces: a thrust surface 41 constituted by the bottom of the cup and against which a complementary reference surface 11 of the bulb bears; and a second thrust surface 42 defined by a blank flared rim at the top of the cup which comes into contact with the complementary thrust surface 32 of the bulb-carrier.

The part 40 is made in such a manner that the two thrust surfaces 41 and 42 lie in planes situated at a predetermined distance apart $D_1$ such that with the above-defined values $d_1$ and f being given (with $d_1$ being set by the bulb-defining standard and f being given by the structure of the reflector/bulb-carrier assembly), the midpoint M of the filament lies at a distance $d_1+D_1$ from the thrust surface 32 of the bulb-carrier, and therefore at a well determined distance from the focus F which is exactly the desired result.

The adaptor/bulb assembly is held in place on the bulb-carrier 30 by the spring 60 applying a force thereon, with the spring 60 being preferably a two-branch spring bearing directly against the end of the bulb, with the end of the spring being locked in place by a hook 36 formed on the bulb-carrier.

In addition, in order to ensure electrical ground contact, the adaptor 40 is made of a metal material and is provided with a lug 47 onto which a female terminal may be fitted, thereby constituting an electrical connection with the metal collar 13 of the bulb.

Figure 2:
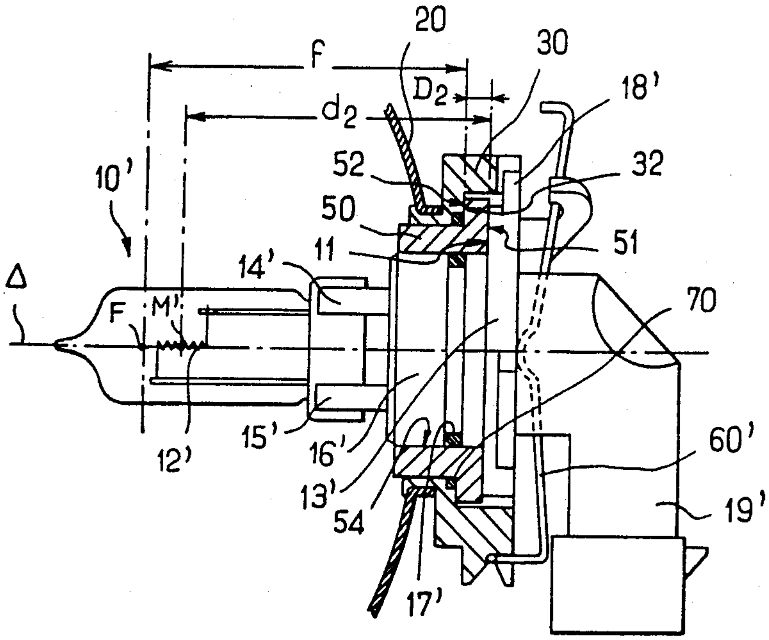
FIG. 2 is similar to FIG. 1 but shows the mounting system configured to allow a U.S. 9005 type bulb to be fitted.

FIG. 2 shows the same lamp as FIG. 1, but fitted with a U.S. 9005 type bulb instead of the European H3 type bulb of FIG. 1. Items which are identical in both figures include the reflector 20 and the bulb-carrier 30 which differs from the bulb-carrier shown in FIG. 1 merely by the spring 60 being removed, whereas the H3 type bulb 10 and its adaptor 40 has been replaced by a new bulb 10', its adaptor 50, and a new spring 70.

The U.S. 9005 type bulb 10' is quite different in structure from the H3 type bulb. The glass bulb containing the filament 12' is mounted on supports 14' and 15' which also provide electrical connection, said supports being mounted in turn on a cylindrical barrel 16' of insulating material which is provided at its rear end with a collar 13' which includes a plurality of radial projections 18' for positioning the bulb properly in the bulb-carrier.

Behind the collar 13', the barrel is extended by a handle 19' enabling the bulb to be grasped and providing electrical connection therewith via two contact terminals incorporated therein and terminating at two opposite ends of the filament (this type of bulb does not include a ground contact).

Finally, the barrel 16' is cylindrical in shape and is provided with an annular groove receiving a sealing ring 17' enabling the bulb to be mounted in sealed manner on the bulb-carrier.

When conventionally mounted, such a bulb is mounted directly on a bulb-carrier situated at the rear of the reflector, with the radial projections 18' constituting a bayonet fitting for locking the bulb in place on its bulb-carrier by rotation through ⅛-th of a turn, with said rotation being facilitated by the handle 19' which is easy to manipulate.

Figure 7:
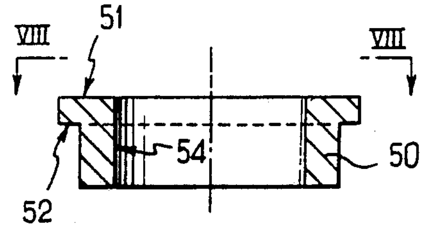
FIG. 7 is a cross-section on line VII—VII of FIG. 8 through the FIG. 2 adaptor for a 9005 type bulb.
Figure 8:
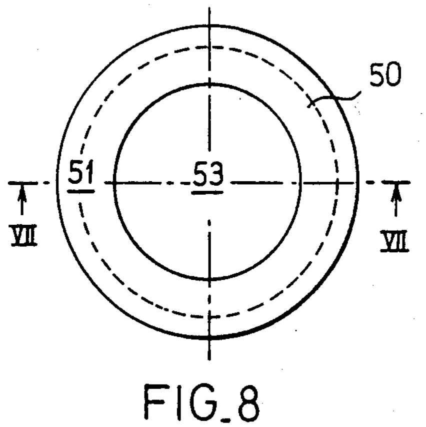
FIG. 8 is a front view of the FIG. 7 adaptor as seen from line VIII—VIII in FIG. 7.

The mounting in the present invention is different: in particular, the bulb 10' is no longer directly mounted on the above-described bulb-carrier 30, but is mounted thereon by means of a specific adaptor 50 (shown on its own in FIGS. 7 and 8); in addition, the bayonet system is not made use of, with the projections 18' being used only for ensuring that the bulb is properly positioned angularly, and not for fixing it to the bulb-carrier.

The adaptor 50 is essentially in the form of a cylindrical ring made of light metal or of insulating material, for example, (since its electrical properties are irreverant, unlike the adaptor 40), which ring is provided with a flange defining two contact surface 51 and 52. The surface 51 makes contact with the facing reference surface 11 of the collar on the base of the bulb (which reference surface is situated at a distance $d_2$ from the midpoint M' of the filament), and the surface 52 makes contact with the facing thrust surface 32 of the bulb-carrier. The two contact surfaces 51 and 52 are separated by a distance $D_2$ such that $d_2+D_2=d_1+D_1$, thereby enabling the midpoint M' of the filament 12' of the bulb 10' to be located in exactly the same position relative to the focus F as the midpoint M of the filament 12 of the bulb 10. It should be observed that the values $D_1$ and $D_2$ are to be taken as being algebraic values: thus whereas the magnitude of $D_1$ is added to $d_1$, the magnitude of $D_2$ is subtracted from $d_2$ since the surface 51 in contact with the reference surface 11 of the bulb is further back than the surface 52 in contact with the thrust surface 32 of the bulb-carrier, whereas the configuration shown in FIG. 1 is the other way around.

It can thus be seen that no adjustment is required to ensure that the midpoint of the filament is properly positioned to the focus of the parabola, regardless of the type of bulb which is used.

Further, the adaptor 50 has an axial bore 53 whose diameter corresponds to the diameter of the cylindrical barrel 16' of the base of a 9005 type bulb, and whose inside wall 54 co-operates with the sealing ring 17' provided on the bulb.

A sealing O-ring 70 is put into place on the outside periphery of the adaptor 50, said sealing ring being received in a corresponding facing provided on the bulb-carrier 30. This provides the required sealing for the fixing system as a whole (given that in a conventional assembly the bulb is mounted directly on a bulb-carrier and sealing is provided by the sealing ring 17', which is not sufficient in the present case since sealing must also be provided at the interface between the adaptor and the bulb-carrier).

The barrel 16' of the lamp base is received in the adaptor 50 with minimal clearance, and may even be a push fit. The same applies for the fit between the adaptor 50 and the bulb-carrier 30. The assembly put into place in this way is held in position in the same manner as in FIG. 1, i.e. by means of a spring 60', which spring has different dimensions in this case (in particular it is bent at a smaller angle), by virtue of the larger size of the U.S. style bulb. the bend in the spring 60' bears against the outside face of the collar 13', thereby simultaneously providing mechanical retention for the assembly and also the desired degree of sealing by virtue of the O-ring 70 being compressed.

What is claimed:

1. A mounting system for mounting a bulb on the reflector of a lamp, in particular the parabolic reflector of a headlamp for a vehicle such as a car, an agricultural machine, an earth-moving machine, or a hoist, the mounting system being such that the bulb may be selected from a first type of bulb and a second type of bulb, with the bulb in each of these types being associated with a radial reference surface situated at a predetermined respective distance $d_1$ or $d_2$ from the midpoint of the filament of the bulb, where $d_1$ is not equal to $d_2$; and wherein the system comprises;

a bulb-carrier fixed to the reflector and defining a radial thrust surface situated at a predetermined distance from the focus of the reflector;

first adaptor means suitable for co-operating with a bulb of the first type, said first adaptor means being provided with an axial bore of a first diameter suitable for receiving the base or support of the bulb, said first adaptor means also including a first contact surface bearing against the reference surface of said first type of bulb, and a second contact surface bearing against the thrust surface of the bulb-carrier, said two contact surfaces being parallel to each other and being at a distance $D_1$ apart; and second adaptor means suitable for co-operating with a lamp of the second type, said second adaptor means being provided with an axial bore of a second diameter suitable for receiving the base or the support of a lamp of the second type, said second adaptor means further including a first contact surface bearing against the reference surface of said bulb of the second type, and a second contact surface bearing against the thrust surface of the bulb-carrier, said two contact surfaces being parallel to each other and being a distance $D_2$ apart, such that, algebraically, $D_2+d_2=D_1+d_1$;

whereby regardless of the type of bulb mounted on the bulb-carrier by the corresponding adaptor means and regardless of the possible type of bulb support, the bulb filament is centered on the axis of the lamp and the axial position of the filament relative to the focus of the reflector is the same.

2. A mounting system according to claim 1, in which the bulb-carrier further includes lockable resilient means for forcing the reference surface of the bulb or of its support against the first contact surface of the corresponding adaptor means.

3. A mounting system according to claim 2, in which the adaptor means are mounted on the bulb-carrier merely by interfitting, with lockable resilient means serving, in addition, to force the second contact surface against the thrust surface of the bulb-carrier.

4. A mounting system according to claim 1, in which the adaptor means further include keying members for determining the angular position of the bulb relative to the axis of the lamp, in particular when the bulb has a transverse filament or when the bulb is provided with incorporated masking means defining a cut-off.

5. A system according to claim 1, in which the adaptor means are electrically conductive and further include electrical connection members for establishing an electrical connection with the metal reference surface of the bulb, which surface constitutes one of the feed terminals thereof.

6. A system according to claim 1, in which a sealing ring is also provided interposed between the bulb-carrier and the adaptor means.

7. A system according to claim 1, in which the axial bore of the adaptor means has an inside surface suitable for co-operating with sealing means provided on the facing portion of a member engaged therewith.

* * * * *